May 2, 1944.   L. M. KLEIN   2,347,832
WINDPROOF MATCHES AND THEIR APPLICATION
TO CIGARETTES AND THE LIKE
Filed Aug. 11, 1941

INVENTOR
Louis M. Klein
BY
ATTORNEY

Patented May 2, 1944

2,347,832

UNITED STATES PATENT OFFICE 2,347,832

WINDPROOF MATCH AND ITS APPLICATION TO CIGARETTES AND THE LIKE

Louis M. Klein, New York, N. Y.

Application August 11, 1941, Serial No. 406,332

3 Claims. (Cl. 44—42)

This invention relates to new and useful improvements in matches, and has particular reference to a windproof match, and in its application to cigarettes, cigars, and the like.

The invention particularly proposes to make a special windproof, rainproof match which may be readily ignited and used in any kind of weather. Furthermore, the invention contemplates a construction by which the improved match may be inserted on or mounted on the tip ends of cigarettes and cigars which will make these articles self-lighting in all kinds of weather. It is pointed out that the new match is also adaptable for ordinary match purposes. The composition for this match consists of a special formula which may be applied to the tip of either a wooden parlor match or the modern safety paper book matches. The chemicals used are few and inexpensive, the flame will be even and sputterless and will be extinguished when reaching the uncoated portion of the match. It is proposed that the match give just enough flame to enable a person to obtain a light for a cigarette, cigar or pipe when used for that purpose.

An important feature of the invention resides in the fact that when the new match is used as an insertion on a cigarette, cigar or the like it is absolutely certain that the cigarette or cigar will be lit every time desired. It is proposed that the body of the match when used for insertion be of a certain construction associated with the tobacco of the cigarette or cigar to insure the effective lighting mentioned.

For further comprehensive of the invention, and of the objects and advantages thereof, reference will be had to the following description and accompanying drawing, and to the appended claims in which the various novel features of the invention are more particularly set forth.

In the accompanying drawing forming a material part of this disclosure—

Figure 1:
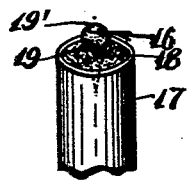
Fig. 1 is a fragmentary perspective view of a cigarette provided with a windproof match constructed in accordance with this invention.
Figure 2:
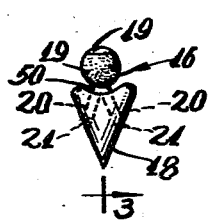
Fig. 2 is an enlarged elevational view of the match per se shown in Fig. 1.
Figure 3:
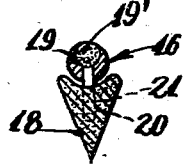
Fig. 3 is a vertical sectional view taken on the line 3—3 of Fig. 2.

In the form of the invention illustrated in Figs. 1 to 3, the windproof match 16 is shown applied to a conventional cigarette 17. The match 16 includes a holder 18 supporting friction igniting material 19 having a quick igniting head 19'. The holder 18 has a conical bottom portion by which it may be forced into the tobacco of the cigarette 17, or the end of a cigar. The holder 18 is formed with several laterally extending passages 20. The igniting material 19 has projection portions 21 extending through the passages 20 and serving to support said igniting material 19 so that there is a space 50 between material 19 and holder 18. This space supplies air to igniting material 19. The passages 20 terminate at the sides of the holder 18.

When the match 16 is struck the head 19' and material 19 burn all the way down along the projecting portions 21 and through the passages 20 and so effectively reach the tobacco of the cigarette, cigar or the like to ignite the same. Then the holder 18 which is of slower burning material lights and burns.

Figure 4:
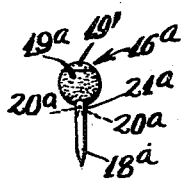
Fig. 4 is a side elevational view of a match constructed in accordance with a modified form of this invention.

In Fig. 4 a modified form of the invention is disclosed in which the match 16ᵃ includes a holder 18ᵃ supporting friction igniting material 19ᵃ having igniting head 19'. The holder 18ᵃ has several passages 20 formed inwards from its top and terminating at the sides of the holder. The friction igniting material 19ᵃ has projecting portions 21ᵃ extending through the passages 20ᵃ. When the match is mounted upon a cigarette, cigar or the like and the friction igniting material is ignited, it will burn down through the passages 20 and so effectively reach the cigarette or cigar.

Figure 5:
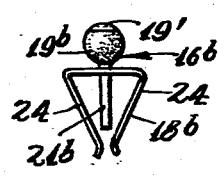
Fig. 5 is an elevational view of a match constructed in accordance with another form of the invention.

In Fig. 5 another form of the invention has been disclosed in which the match 16ᵇ is provided with a holder 18ᵇ supporting friction igniting material 19ᵇ. The holder 18ᵇ has several downwardly extending arms 24 adapted to be forced into the tobacco of a cigarette, cigar or the like. The igniting material 19ᵇ has a downwardly projecting portion 21ᵇ adapted to extend into the tobacco of the cigarette or cigar to effectively light same.

Figure 6:
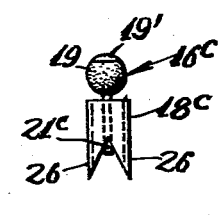
Fig. 6 is an elevational view of a match embodying another design of the invention.

In Fig. 6 another form is shown in which the match 16ᶜ is provided with a hollow cylindrical holder 18ᶜ having a pair of bottom prongs 26 by which it may be forced into the tobacco of a cigarette, cigar or the like. The holder 18ᶜ supports friction igniting material 19ᶜ which is provided with a downward projection 21ᶜ adapted to extend into the tobacco of the cigarette, cigar or the like.

Figure 7:
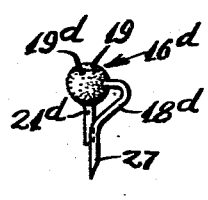
Fig. 7 is a side elevational view of a match in accordance with another modification.

In Fig. 7 another form of the invention is disclosed in which the match 16ᵈ is provided with a holder 18ᵈ which includes a downwardly extending prong 27 adapted to be forced into the tobacco of the cigar, cigarette or the like. The holder 18ᵈ supports friction igniting material 19ᵈ which is provided with a downwardly projecting portion 21ᵈ adapted to engage into the tobacco.

Figure 8:
Fig. 8 is an elevational view of a match constructed in accordance with still another form of this invention.

In Fig. 8 another form of the invention is disclosed in which the match 16ᵉ is provided with a holder consisting of two prongs 18ᵉ mounted on the sides of friction igniting material 19ᵉ of the match. The prongs 18ᵉ are adapted to be inserted into the tobacco of the cigarette or cigar. The friction igniting material 19ᵉ is provided with a downwardly projecting portion 21ᵉ which will also extend into the tobacco.

Figure 9:
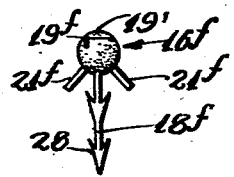
Fig. 9 is a side elevational view of a match embodying another feature of this invention.

In Fig. 9 another match 16ᶠ is illustrated which includes a holder 18ᶠ having several anchorage prongs 28 adapted to engage and grip the tobacco of a cigarette, cigar or the like. The holder 18ᶠ supports friction igniting material 19ᶠ which is provided with several downwardly extending projections 21ᶠ adapted to engage into the tobacco.

Figure 10:
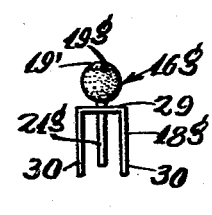
Fig. 10 is an elevational view of still another match constructed in accordance with another form of the invention.

In Fig. 10 another form of the invention is disclosed in which the match 16ᵍ is provided with a holder 18ᵍ having a central portion 29 and a pair of spaced downwardly projecting prongs 30 which are adapted to engage into the tobacco of a cigar, cigarette or the like. The holder 18ᵍ supports friction igniting material 19ᵍ which has a downward projection 21ᵍ extending downwardly between the arms 30.

Figure 11:
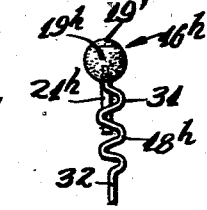
Fig. 11 is a side elevational view of still another match embodying an additional feature of this invention.

In Fig. 11 another match 16ʰ is shown including a holder 18ʰ having a wavy central portion 31 terminating in a downwardly extending bottom end 32. The holder 18ʰ supports friction igniting material 19ʰ having a downwardly extending projection 21ʰ adapted to extend into the tobacco of a cigarette or cigar when the holder is mounted thereon.

Figure 13:
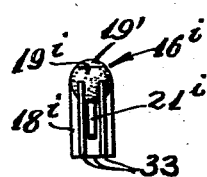
Fig. 13 is a side elevational view of Fig. 12.
Figure 12:
Fig. 12 is a plan view of a match of modified form.

In Figs. 12 and 13 a match 16ⁱ is shown and this match includes a holder 18ⁱ supporting friction igniting material 19ⁱ. The holder 18ⁱ is formed from several sheet plates 33 mounted through each other, as particularly illustrated in Fig. 12. The friction igniting material 19 is provided with a downward projection 21ⁱ which will extend into the tobacco of a cigarette, cigar or the like when the match is mounted thereon.

Figure 14:
Fig. 14 is a plan view of a match of still another modified form.
Figure 15:
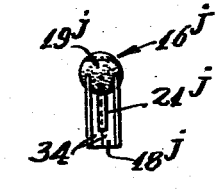
Fig. 15 is a side elevational view of Fig. 14.

In Figs. 14 and 15 another form of the invention is disclosed in which the match 16ʲ includes a holder 18ʲ which supports friction igniting material 19ʲ. The holder 18ʲ is formed from two small sheets of material 34 which are crossed one through the other as clearly shown in Figs. 14 and 15. The friction igniting material 19ʲ is provided with a downward projection 21ʲ adapted to extend into the tobacco of a cigarette, cigar or the like.

Figure 16:
Fig. 16 is a similar view to Fig. 1, but showing the match applied to a cigar.

In Fig. 16 the windproof match 16, is shown applied to a conventional cigar 17'. In other respects this form is identical with the previous forms.

Figure 17:
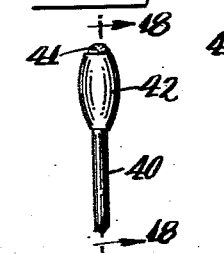
Fig. 17 is a side view of a match in accordance with another modified form of the invention.
Figure 18:
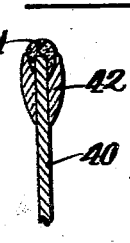
Fig. 18 is a sectional view taken on the line 18—18 of Fig. 17.

In Figs. 17 and 18, a match stick 40 is illustrated with the usual match striking friction igniting head 41. This striking head and the upper part of the match stick 40 are partially covered by a layer of substance 42 for the purpose of making the match windproof and rainproof so that it may be ignited and used in any kind of weather.

Figure 19:
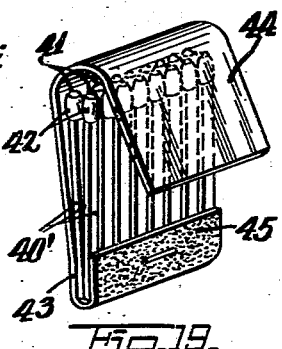
Fig. 19 is a perspective view of a book match in which the matches are constructed in accordance with the forms shown in Figs. 17 and 18.

In Fig. 19 match sticks 40' are shown placed in the usual book package form 43 which has the customary cover flap 44 and the abrasive surface 45.

These matches may also be held in any other type of container.

The weatherproofing substance 42 may be composed of the following ingredients: water, potassium perchlorate, iron oxide, red phosphorus, and glue, but other ingredients may also be used for the weatherproofing substance.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A match for insertion in the end of an article to be ignited, comprising a holder of inflammable material for insertion in the end of said article, a member of friction igniting material, and projections on said member and extending through said holder for igniting said holder and article when said member is ignited by being rubbed against a stationary surface, said holder being conical in shape and having its pointed end directed away from said member.

2. A match for insertion in the end of an article to be ignited, comprising a holder of inflammable material for insertion in the end of said article, a member of friction igniting material, and projections on said member and extending through said holder for igniting said holder and article when said member is ignited by being rubbed against a stationary surface, said holder being cylindrical in shape with said member mounted on one end and its other end pointed.

3. A match for insertion in the end of an article to be ignited, comprising a holder of inflammable material for insertion in the end of said article, a member of friction igniting material, and projections on said member and extending through said holder for igniting said holder and article when said member is ignited by being rubbed against a stationary surface, said member being spaced from said holder providing an opening through which air is adapted to circulate causing the member to burn more freely.

LOUIS M. KLEIN.